Sept. 7, 1937.　　　C. W. WEISS　　　2,092,437
TRANSMISSION DEVICE
Filed Sept. 11, 1936　　　3 Sheets-Sheet 1

INVENTOR
Carl W. Weiss
BY
Redding, Greeley & O'Shea
ATTORNEYS

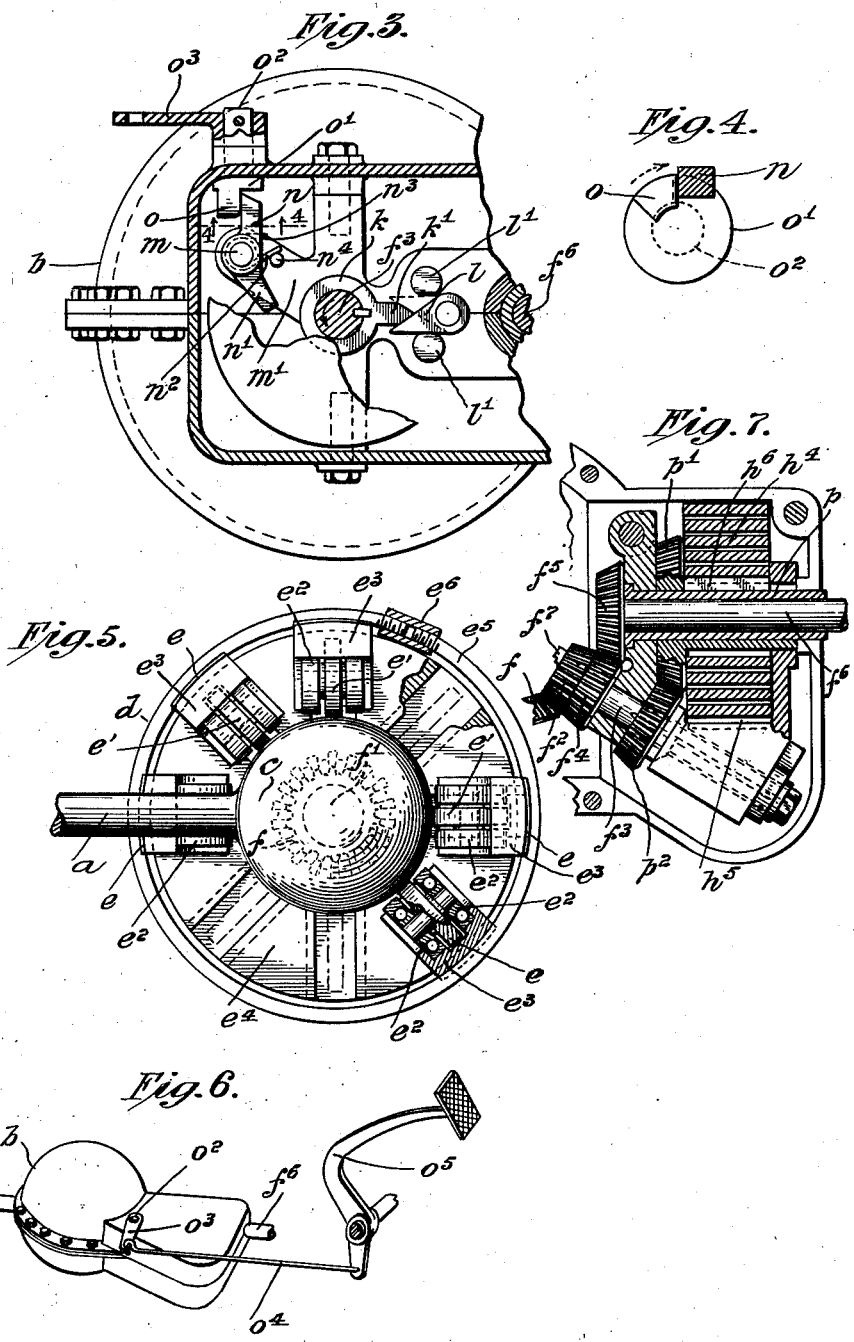

Patented Sept. 7, 1937

2,092,437

UNITED STATES PATENT OFFICE 2,092,437

TRANSMISSION DEVICE

Carl W. Weiss, Brooklyn, N. Y.

Application September 11, 1936, Serial No. 100,249

9 Claims. (Cl. 74—198)

This invention relates to power transmission devices of the general character of that shown in Letters Patent of the United States No. 1,469,059 and No. 1,541,882 and covered broadly in the latter patent in which there are combined a rotating body or member having a spherical bearing surface, a second rotating body or coacting member, called the mutor, having a driving engagement, through gripping elements, with said spherical bearing surface, and suitable supports and transmitting elements, one of such rotating bodies or coacting members, called the mutor, being capable of being changed in position with respect to the other of the coacting members to vary the speed ratio of the two coacting members. In such earlier transmission devices, in which the spherical coacting member is internally spherical, some of the gripping elements which effect driving engagement between the two coacting members and are carried by one of such coacting members, called the mutor or change member, pass out of contact, in the movement of the mutor toward the zero position, with the internally spherical coacting member shown in the drawings of said patent. This results in imposing the load, when it is greatest, as in starting from zero, upon some only of the gripping elements, that is, upon those which are still in contact with the internally spherical coacting member, whereas, when the mutor is in or approximately in the 1:1 position, all of the gripping elements carried by the mutor are in driving contact with the spherical member at a time when the torque is least. Furthermore, in the rotation of the mutor, as each gripping element passes from contact with the internally spherical member, it becomes unloaded and its radius of operation increases slightly and when it again enters the internally spherical member the gripping element must be forced back into its position of normal radius, this action being necessarily and undesirably accompanied by shock, noise and excessive wear as each gripping element passes into contact with the internally spherical member. Because of the structurally necessary considerable angular opening of the internally spherical member a large number of the gripping elements pass out of contact with the internally spherical member in the low speed position of the mutor. In the design of the old construction it therefore became necessary to compromise as to the extent of angular displacement of the mutor with a view to setting up the least possible limitations between the two obtainable extremes, that is, the low speed drive and the 1:1 drive, neither the low speed drive nor the 1:1 drive being reached in a degree satisfactory in the performance of the automobile. Furthermore, the structural limitations of the old device were such that it was impossible, without mechanical complications, to have the driven shaft of the transmission device in line or approaching parallelism with the motor shaft, as is desirable in automotive practice.

Again, the new arrangement in which the mutor can be disposed externally with respect to an externally spherical coacting member permits a very considerable reduction of diameter of the transmission device for the transmission of equal power. It will be noted also that the new relation makes it possible to increase the number of gripping elements operative for equal external diameter and also makes it possible to substitute a positive radial pressure means for assuring equally loaded driving engagement of all the gripping elements with the coacting externally spherical member. Consequently, it becomes possible to secure greatly increased power in transmission devices of the same size. As still another advantage of the improved construction it becomes impossible for the mutor to pass through the position of 1:1 drive as the resistance decreases, so that the racing of the engine which would otherwise take place is prevented. At the same time it is always possible to restore the mutor at will to the original low speed position.

In the embodiments of the invention illustrated in the accompanying drawings—

Figure 3 is a view in section on the plane indicated by the broken line 3—3 of Figure 1.

Figure 4 is a detail view, in section on the line 4—4 of Figure 3, of a portion of the device shown in Figure 3.

Figure 5 is a partly sectional view on the plane indicated by the broken line 5—5 of Figure 1.

Figure 6 is a view in perspective illustrating the connection of the usual clutch pedal for controlling the movement of the control shaft under the influence of the reaction or accumulator spring.

Figure 7 is a detail view in sectional elevation showing the reaction or accumulator spring disposed around the driven shaft of the transmission device instead of at one side of the same, as in Figure 1.

Figure 1:
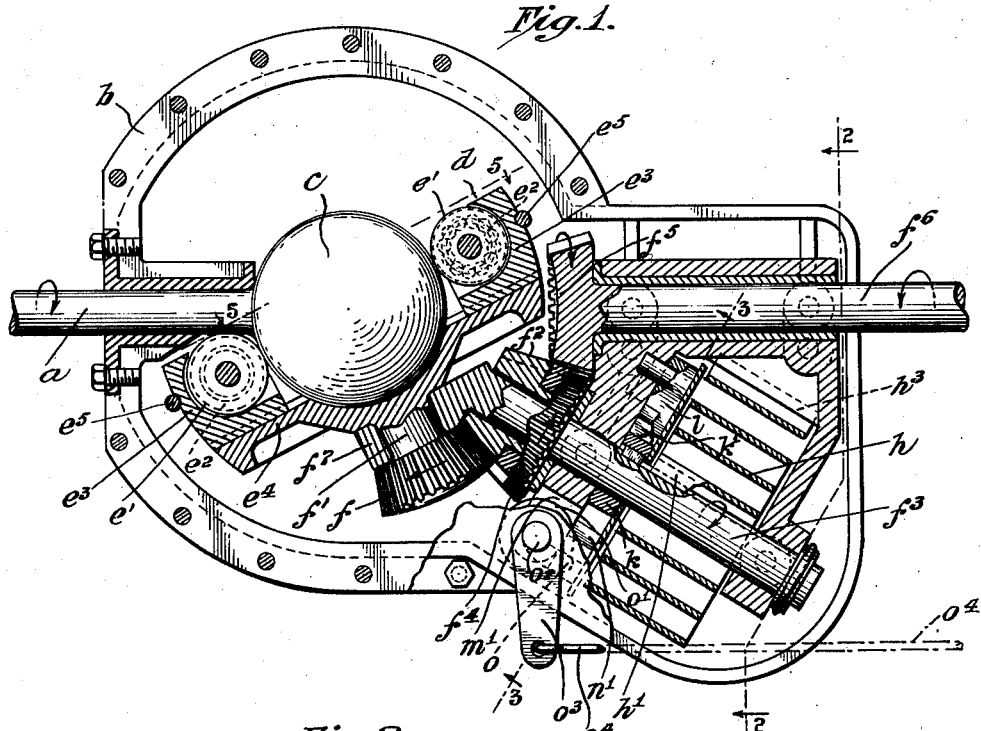
Figure 1 is a view in axial, sectional elevation of one embodiment of the invention.

In the embodiments of the invention illustrated in the drawings the driving or motor shaft $a$ is shown as mounted for rotation in a frame rigidly secured to the housing $b$ which supports the several working parts of the mechanism to be described. The shaft $a$ has secured thereto or formed therewith an externally spherical driving member $c$. The mutor $d$, which coacts with the externally spherical driving member $c$, is armed with gripping units $e$, each of which comprises a gripping roller $e^1$ mounted in roller bearings $c^2$ in a block $e^3$ mounted to slide radially on the mutor disc $e^4$, the several gripping elements $e$ being pressed toward the externally spherical coacting member $c$ by a clamp ring $e^5$ provided with a turnbuckle $e^6$. Operative engagement of the gripping elements and therefore of the mutor with the coacting member $c$ is thus positively assured.

The mutor $d$ is supported so that the plane of the centers of the gripping elements passes through the center of the spherical coacting member and so that its angular position and therefore the angular position of the gripping elements $e$ with respect to the coacting driving member $c$ can be shifted in response to the variations of torque and under the control of the operator. As shown the mutor disc $e^4$ is secured to or integral with the spindle $f^1$ of a gear $f$ in mesh with a gear $f^2$ which is rotatably mounted on the shaft $f^3$ which is the control shaft. A gear $f^4$, fixed on the hub of the gear $f^2$, meshes with a gear $f^5$ which in this instance is fixed on the driven shaft $f^6$. The spindle $f^1$ of the mutor $d$ is mounted in an arm $f^7$ of the control shaft $f^3$, so that by rotation of the control shaft $f^3$ in response to torque the spindle $f^1$ of the mutor may be moved from its initial or near zero position, represented in Figure 1, to a position in line with the motor shaft $a$ and the driven shaft $f^6$, the pinion $f$ in this movement of the mutor rolling with a planetary motion upon the pinion $f^2$. In such movement of the mutor motion may be transmitted from the motor shaft $a$ to the driven shaft $f^6$ through all degrees from near zero to a 1:1 ratio, if the car resistance is not too great. In such movement the reaction member or accumulator spring now to be mentioned is wound up and power is stored therein.

Figure 2:
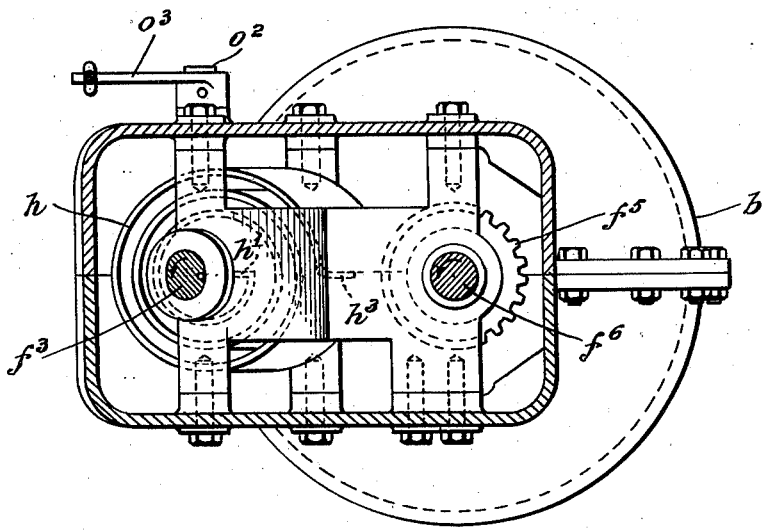
Figure 2 is a view in section on the irregular plane indicated by the broken line 2—2 of Figure 1.

The spiral reaction member or accumulator spring $h$, in the construction shown in Figures 1, 2, and 5, is disposed around the control shaft $f^3$, having one end anchored to the control shaft, as at $h^1$, and the other end anchored, as at $h^3$, to the fixed frame in which the control shaft is mounted.

The reaction member here shown as a spring $h$ tends to rotate the control shaft $f^3$ in a clockwise direction, as seen in Figure 3, in which the control shaft is assumed to be in a position of rest in the initial or slow speed position with the mutor $d$ also in its initial or slow speed position, as shown in Figure 1. If the motor is started with the parts in the positions described the mutor, by reason of its driving engagement with the externally spherical body $c$, will rotate on its own axis and the pinion $f$, also rotating with the mutor, will roll about the pinion $f^2$. This action may continue until the pinion $f$ rolls entirely around the pinion $f^2$ and the mutor is shifted from the position shown in Figure 1 through and beyond the 1:1 position until it again reaches the position shown in Figure 1, in which it is stopped as will be described. In this movement of the parts the arm $f^7$, in which the shaft $f^1$ of the pinion $f$ is carried, will also be moved through 360 degrees, rotating the control shaft $f^3$ and winding the spring $h$. If it be assumed now that the automobile, to which the transmission is applied, is started from a condition of rest when the mutor is in its initial or low speed position, it will be understood that as the resistance, now overcome, continues to decrease the power stored in the spring will cause the control shaft to rotate in a counterclockwise direction and the mutor to be shifted from its slow speed position to its 1:1 position in which position the further shifting of the mutor will be prevented by a stop to be described.

In this angular movement of the mutor, as will be observed, none of the gripping elements $e$ at any time passes out of contact with the externally spherical driving member $c$ so that even when the resistance is greatest, as in starting an automobile from a condition of rest, all of the gripping elements are in engagement with the driving member and the development of shocks, noise and excessive wear, in the passing of any gripping element out of driving engagement with the externally spherical driving member $c$ and in the return of such gripping element into engagement with the driving member, is wholly avoided. Furthermore, the return of the mutor fully to its 1:1 position is possible and full accomplishment of the theoretical advantages of the transmission device is realized, while such complete return of the mutor to the 1:1 position makes possible the alinement or parallel positioning of the driven shaft with the driving shaft, which is so desirable in automotive installations. In this arrangement, moreover, as will be observed, it is possible to increase the number of gripping elements available for equal torque, to provide means for assuring positive driving engagement of the driven elements with the spherical member and to secure greatly increased power in transmission devices of the same size.

To make it impossible for the mutor to pass beyond the position of 1:1 drive as resistance decreases and thereby to prevent racing of the engine which otherwise would take place, there is provided, as shown in Figures 1, 2, 3, 4 and 6, a device which prevents rotation of the control shaft $f^3$ through more than 360 degrees and corresponding movement of the mutor, notwithstanding possible continued decrease of resistance. For this purpose there is secured to the control shaft $f^3$, as shown in Figure 3, a collar $k$ formed with an arm $k^1$, preferably beveled, for cooperation with a pivoted stop $l$ which may swing between two fixed stops $l^1$, the swinging of the stop $l$ permitting the full rotation of the control shaft through 360 degrees. There is also pivotally mounted at $m$ on a fixed member $m^1$ a stop which has two arms $n$ and $n^1$. A spring $n^2$, which has one end bearing against the arm $n$, as shown at $n^3$, and the other bearing against a stop $n^4$ on the fixed frame member $m^1$, tends to rotate the stop $n$, $n^1$ in a counterclockwise direction, as seen in Figure 3. A stop $o$ mounted on the hub $o^1$ of a rotatable stud $o^2$ stands normally in position, as shown in Figure 3, to engage the arm $n$ and prevent rotation of the stop $n$, $n^1$ in a counterclockwise direction. In order that the position of the stop $o$ may be controlled by the operator or driver of the automobile there is secured to the stud $o^2$ and arm $o^3$ which may be connected by a link $o^4$ to the usual clutch pedal $o^5$ of the automobile so that when the driving clutch is thrown out of engagement, as when the automobile is stationary, by the same movement of the operator's foot the stop $o$, being eccentric with respect to the stud $o^2$, moves the arm $n$ in a clockwise direction, as seen in Figure 3, and the arm $n^1$ out of the path of movement of the arm $k^1$ on the collar $k$ of the control shaft $f^3$, but when, in the movement of the control shaft $f^3$ the mutor reaches the 1:1 position, when the resistance is least, the arm $k^1$ contacts the arm $n^1$ of the stop $n$, $n^1$ and, the arm $n$ being then in contact with the stop $o$, prevents the movement of the control shaft through more than 180 degrees in a clockwise direction, the mutor being then in the 1:1 position. In the event of continued movement of the automobile on a level road at increasing speed and diminished resistance, under the operation of the accelerator, the stop arm $k^1$ does not move away from the stop arm $n^1$ but remains in contact therewith, maintaining the mutor in the 1:1 position and leaving the increased speed to be maintained under the influence of the accelerator.

If, under the conditions just described, it becomes necessary to stop the automobile, as for a red traffic light, the mutor must be restored to its initial or slow speed position, in order that the resistance in starting again may be overcome. This is accomplished, in the operation of the mechanism shown, when the operator depresses the clutch pedal $o^5$ for the purpose of disconnecting the transmission from the motor, for, through the connection of the clutch pedal to the arm $o^3$ the stop $o$ receives a movement of rotation and through contact with the arm $n$ of the pivoted stop $n$, $n^1$ turns the stop in a clockwise direction and moves the arm $n^1$ of the stop out of the path of the arm $k^1$ and so permits the movement of the arm $k^1$ in a clockwise direction and the rotation of the control shaft $f^3$ in a clockwise direction through approximately 180 degrees back to the initial position shown in Figure 3, the mutor being thus shifted to its initial position, placing the transmission device in readiness for the transmission of power from the motor necessary to overcome the resistance in starting the automobile from a condition of rest.

It will be obvious that when limitations of space render desirable the reduction in the outside dimensions of the transmission device as represented in Figure 1, where the reaction member or accumulator spring $h$ encircles the control shaft $f^3$, such reduction in outside dimensions may be accomplished, as shown in Figure 7, by disposing the reaction member or spring $h^4$ about the driven shaft $f^6$. In the modification shown in Figure 7 the driven shaft $f^6$, as before, has its gear $f^5$ in engagement with the gear $f^4$ on the control shaft $f^3$, which has a stop arm $k^1$ secured to it by the collar $k$. The gear $f^2$ on the control shaft engages the gear $f$ of the mutor axis and the control shaft has the mutor arm indicated at $f^7$ in Figure 7. The spring $h^4$ in this modification is anchored to a fixed member, as at $h^5$, and at its other end, as at $h^6$, to a sleeve $p$ mounted on the driven shaft and having fixed thereto a gear $p^1$ which meshes with a gear $p^2$ keyed on the control shaft. This arrangement not only permits some reduction in external dimensions, but through the employment of the gear $p^1$, to which the spring is connected, larger than the gear $p^2$ on the control shaft, permits the use of a more desirable spring for equal torque since the angular movement required is much less than the angular movement of the control shaft and therefore the mutor.

Figure 8:
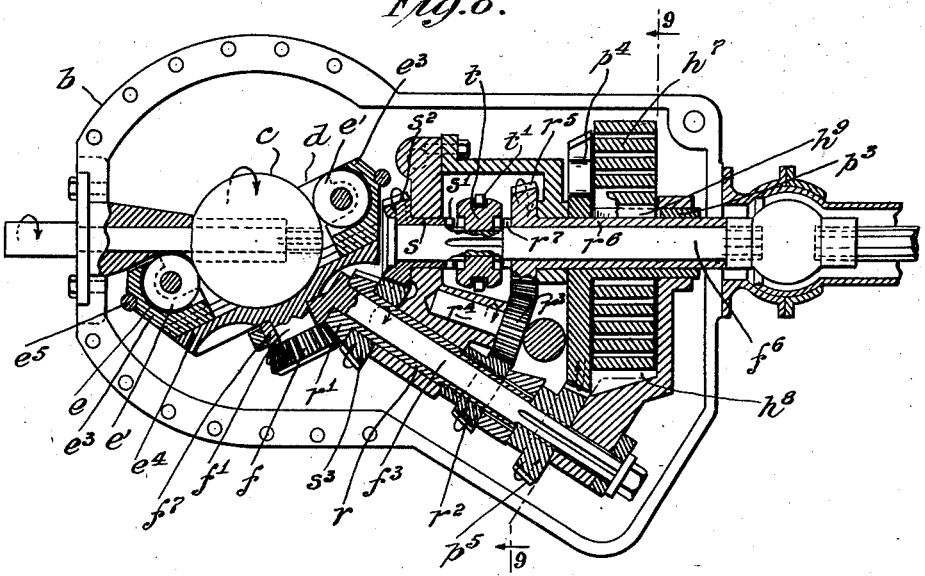
Figure 8 is a view generally similar to Figure 1, but with the reaction or accumulator spring around the driven shaft and with a reversing gear incorporated in the transmission device.
Figure 9:
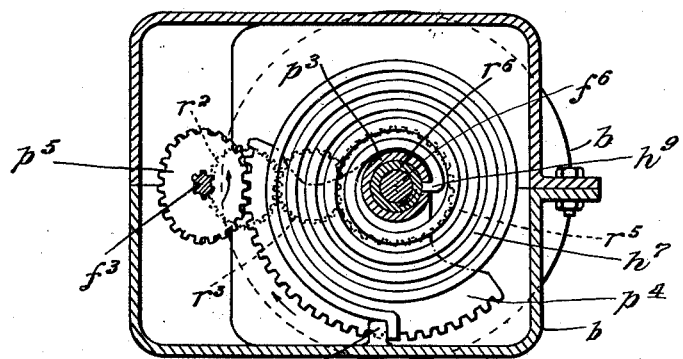
Figure 9 is a view in section on the plane indicated by the broken line 9—9 of Figure 8.
Figure 10:
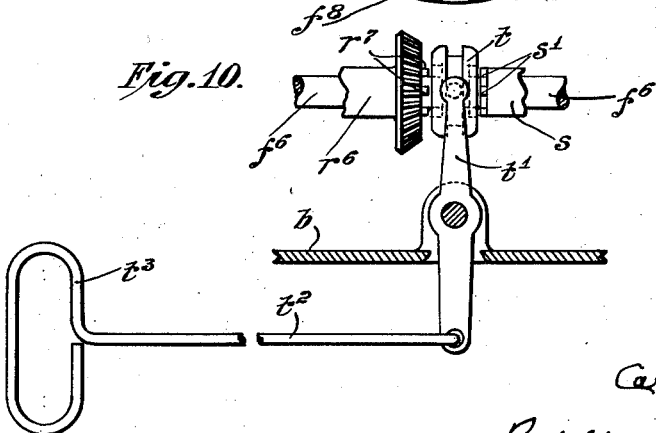
Figure 10 is a view in section and partly diagrammatic illustrating a means by which the reversing gear may be manually controlled.

The installation in an automobile of a transmission device as shown in Figure 1 requires the provision of a reversing gear independent of the transmission device, but it is easily possible to incorporate a reversing gear in the transmission device, as shown in Figures 8, 9 and 10. In this embodiment of the invention there is mounted loosely on the control shaft $f^3$ a sleeve $r$ which at its inner end carries a pinion $r^1$ in engagement with the gear $f$ on the spindle $f^1$ of the mutor, functioning in the same manner as before. Near its other end the sleeve $r$ carries a pinion $r^2$ which meshes with an intermediate gear $r^3$ carried by a spindle $r^4$ mounted in the fixed frame. The intermediate gear $r^3$ meshes with a gear $r^5$ on a sleeve $r^6$ mounted loosely on the driven shaft $f^6$ and formed at its end with clutch teeth $r^7$. Also mounted loosely on the driven shaft $f^6$ is a sleeve $s$ formed at one end with clutch teeth $s^1$ and carrying a gear $s^2$ which meshes with a gear $s^3$ which is secured to or integral with the gear $r^1$ above mentioned. The control shaft $f^3$, as will be understood, is provided, as before, with an arm $f^7$ which carries the spindle $f^1$ of the mutor. On the driven shaft $f^6$ is splined an annularly grooved double clutch member $t$ which may be moved longitudinally either into engagement with the clutch teeth of the sleeve $s$, so that the driven shaft $f^6$ may be rotated in a forward direction, or into engagement with the clutch teeth of the sleeve $r^6$ and gear $r^5$ so that the driven shaft $f^6$ may be rotated in reverse direction through the intermediate gear $r^3$ from the gear $r^2$ above mentioned.

The clutch member $t$ may be shifted at the will of the operator by any convenient means. As shown in Figure 10 it may be engaged by a shifting lever $t^1$ to which is connected a link $t^2$ with a handle $t^3$ in a position convenient for the operator.

The application of the reaction spring to the construction shown in Figures 8 and 9 is substantially the same as in the construction shown in Figure 7. The reaction spring $h^7$ is anchored at one end to the fixed frame, as at $h^8$, and at the other end, as at $h^9$, is anchored to the sleeve hub $p^3$ of a gear segment $p^4$ which meshes with a pinion $p^5$ splined on the control shaft $f^3$. It therefore functions in connection with the control shaft in the same manner as does the reaction spring $h^4$ of Figure 7, as described above.

In describing the operation of the transmission device it will be assumed that the transmission device as shown in Figures 1–6 is applied to an automobile, that the shaft $a$ is the motor shaft, that is, a shaft coupled to the motor through a clutch as usual, and that the shaft $f^6$ is the transmission shaft geared to the driving wheels through the usual differential gear. It will also be assumed that the parts are in the positions represented in Figure 1, with the motor shaft $a$ stationary, the automobile at rest, the arm $f^7$ of the control shaft $f^3$ resting against the upper side of the pivoted stop $l$, as shown in Figure 3, and the stop lever $n$, $n^1$ and the stop $o$ in the positions also shown in Figure 3. If now the motor is started and the shaft a and externally spherical body c are set in rotation, the mutor d will be caused to rotate on its own axis and the pinion f to roll about the periphery of the pinion f². The arm f⁷ of the control shaft f³, being carried with the spindle f¹, will perform a complete revolution of 360 degrees causing the control shaft f³ also to rotate through 360 degrees. This rotation of the control shaft will wind up the spring h. Because the stop lever n, n¹ can yield in a clockwise direction against the tension of the spring n², the arm k¹ of the control shaft f³ will pass the stop lever n, n¹ and continue its movement until it strikes the underside (in Figure 3) of the pivoted stop l. In the complete revolution of the arm f⁷ the mutor will be shifted through its possible complete angular displacement, in this movement passing through and beyond the 1:1 position, being finally brought to rest in the same angular position shown in Figure 1 through the coaction of the pivoted stop l with the arm k¹ of the control shaft. In this position motion at the lowest speed is transmitted from the motor shaft a to the driven shaft f⁶ and the automobile will be started at slow speed from its condition of rest. As the automobile continues its movement and the resistance is decreased the reaction spring h, acting through the control shaft f³ and the arm f⁷, will shift the mutor from the low speed position shown toward the 1:1 position and when the 1:1 position of the mutor is attained the movement of the mutor through and beyond the 1:1 position will be prevented by contact of the arm k¹ of the collar k on the control shaft f³ with the end of the arm n¹ of the stop lever n, n¹, which is then held in position by the stop o. The transmission device will then continue to operate at the 1:1 ratio until such time as it is necessary that the automobile be brought to rest, and at that time the opening of the clutch by the operator will rotate the stud o² and so cause the stop o to swing the stop lever n, n¹ on its axis, moving the arm n¹ out of the path of the arm k¹ and permitting the control shaft to continue its rotation in a clockwise direction until it is again stopped by contact of the arm k¹ with the upper side of the pivoted stop l at which time the mutor will have assumed again the slow speed position, in readiness for the re-starting of the automobile as already described.

It will be understood that various changes in details of construction and arrangement may be made to suit different conditions of use and that, except as pointed out in the accompanying claims, the invention is not restricted to the particular constructions shown and described herein or any of them.

I claim as my invention:

1. A power transmission device comprising an externally spherical driving member and a coacting member consisting of a carrier capable of angular displacement and gripping elements supported on the carrier about the externally spherical member in contact with the externally spherical surface thereof, the gripping elements being radially movable toward the driving member, and a ring encircling the gripping elements and provided with a turnbuckle to force the gripping elements into contact with the driving member.

2. A power transmission device comprising a spherical driving member, a coacting member consisting of a carrier and gripping elements supported on the carrier in contact with the spherical surface of the driving member and shiftable from a position with the plane of the gripping elements substantially approaching the axis of the driving member to a position with the axis of rotation of the coacting member substantially in line with the axis of the driving member, a driven shaft, intermeshing gears whereby rotary movement is imparted from the coacting member to the driven shaft, and means to prevent shifting of the coacting member to a position with the plane of its gripping elements more than a right angle from the last named position.

3. A power transmission device comprising a spherical driving member, a coacting member consisting of a carrier and gripping elements supported on the carrier in contact with the spherical surface of the driving member and shiftable from a position with the plane of the gripping elements substantially approaching the axis of the driving member to a position with the axis of rotation of the coacting member substantially in line with the axis of the driving member, a driven shaft, intermeshing gears whereby rotary movement is imparted from the coacting member to the driven shaft, a control shaft in operative relation with the coacting member to shift the same, a stop arm on the control shaft, and a stop in the path of movement of the stop arm to prevent shifting of the coacting member to a position with the plane of its gripping elements more than a right angle from the last named position.

4. A power transmission device comprising a spherical driving member, a coacting member consisting of a carrier and gripping elements supported on the carrier in contact with the spherical surface of the driving member and shiftable from a position with the plane of the gripping elements substantially approaching the axis of the driving member to a position with the axis of rotation of the coacting member substantially in line with the axis of the driving member, a driven shaft, intermeshing gears whereby rotary movement is imparted from the coacting member to the driven shaft, a control shaft in operative relation with the coacting member to shift the same, a stop arm on the control shaft, a stop in the path of movement of the stop to prevent shifting of the coacting member to a position with the plane of its gripping elements more than a right angle from the last named position, and manually controlled means to render the stop ineffective.

5. A power transmission device comprising an externally spherical driving member, a coacting member consisting of a carrier and gripping elements supported on the carrier and disposed about the externally spherical member in contact with the externally spherical surface thereof, a driven shaft, intermeshing gears whereby rotary movement is imparted from the coacting member to the driven shaft, one of said gears being carried by the coacting member, and another of said gears being carried by the driven shaft, means to transmit motion from the first of said gears to the other, a control shaft supporting said transmitting means and having an arm in engagement with the coacting member, whereby the angular position of the coacting member is shifted through rotation of the control shaft, and means to rotate the control shaft.

6. A power transmission device comprising an externally spherical driving member, a coacting member consisting of a carrier and gripping elements supported on the carrier and disposed about the externally spherical member in contact with the externally spherical surface thereof, a driven shaft, intermeshing gears whereby rotary movement is imparted from the coacting member to the driven shaft, one of said gears being carried by the coacting member, and another of said gears being carried by the driven shaft, means to transmit motion from the first of said gears to the other, a control shaft, means whereby the angular position of the coacting member with respect to the driving member is shifted through rotation of the control shaft, and a reaction member operatively connected with the control shaft and whereby the control shaft is rotated.

7. A power transmission device comprising an externally spherical driving member, a coacting member consisting of a carrier and gripping elements supported on the carrier and disposed about the externally spherical member in contact with the externally spherical surface thereof, a driven shaft, a control shaft, means whereby the angular position of the coacting member with respect to the driving member is shifted through rotation of the control shaft, intermeshing gears whereby rotary movement is imparted from the coacting member to the driven shaft, and a reaction spring coacting with the control shaft and having one end anchored to a fixed point and the other end in fixed relation with the control shaft and whereby the control shaft is rotated.

8. A power transmission device comprising a spherical driving member, a coacting member consisting of a carrier and gripping elements supported on the carrier in contact with the spherical surface of the driving member and shiftable from a position with the plane of the gripping elements substantially approaching the axis of the driving member to a position with the axis of rotation of the coacting member substantially in line with the axis of the driving member, a driven shaft, intermeshing gears whereby rotary movement is imparted from the coacting member to the driven shaft, a control shaft in operative relation with the coacting member to shift the same, a stop arm on the control shaft, a stop in the path of movement of the stop arm to prevent rotation of the control shaft through more than 360 degrees, and a second stop in the path of the stop arm to prevent shifting of the coacting member to a position with the plane of its gripping elements more than a right angle from the last named position.

9. A power transmission device comprising a spherical driving member, a coacting member consisting of a carrier and gripping elements supported on the carrier in contact with the spherical surface of the driving member and shiftable from a position with the plane of the gripping elements substantially approaching the axis of the driving member to a position with the axis of rotation of the coacting member substantially in line with the axis of the driving member, a driven shaft, intermeshing gears whereby rotary movement is imparted from the coacting member to the driven shaft, a control shaft in operative relation with the coacting member to shift the same, a stop arm on the control shaft, a stop in the path of movement of the stop arm to prevent rotation of the control shaft through more than 360 degrees, a second stop in the path of the stop arm to prevent shifting of the coacting member to a position with the plane of its gripping elements more than a right angle from the last named position, and manually controlled means to render the last named stop ineffective.

CARL W. WEISS.